United States Patent [19]

Lebershausen

[11] Patent Number: 4,905,506
[45] Date of Patent: Mar. 6, 1990

[54] METHOD OF TESTING A SEISMIC TORSIONAL VIBRATION DAMPER FOR SERVICEABILITY

[75] Inventor: Klaus Lebershausen, Grünstadt, Fed. Rep. of Germany

[73] Assignee: Daimler-Benz AG, Stuttgart, Fed. Rep. of Germany

[21] Appl. No.: 317,909

[22] Filed: Mar. 1, 1989

[30] Foreign Application Priority Data

Mar. 25, 1988 [DE] Fed. Rep. of Germany ....... 3810194

[51] Int. Cl.$^4$ ........................................... G01M 19/00
[52] U.S. Cl. ..................................... 73/118.1; 73/660
[58] Field of Search ...................... 73/847, 118.1, 660, 73/582

[56] References Cited

U.S. PATENT DOCUMENTS 4,683,746 8/1987 Cullingford ........................ 73/118.1

FOREIGN PATENT DOCUMENTS 2438641 2/1976 Fed. Rep. of Germany .
2718790 11/1977 Fed. Rep. of Germany .
2701319 7/1978 Fed. Rep. of Germany .
2936403 3/1981 Fed. Rep. of Germany .
3040023 6/1981 Fed. Rep. of Germany .
3441805 5/1986 Fed. Rep. of Germany .

OTHER PUBLICATIONS

*Physikalisches Praktikum,* W. Westphal, 1955, pp. 313–316.

*Primary Examiner*—Jerry W. Myracle
*Attorney, Agent, or Firm*—Barnes & Thornburg

[57] ABSTRACT

A method is described for testing the serviceability of a seismic torsional vibration damper. In the method, a test piece, which is constructed as a viscosity torsional vibration damper and whose seismic mass is enclosed entirely liquid-tight, is flanged to the free end of a torsion-spring bar, which, in its turn, is bolted in a torsionally stiff manner onto a large stationary mass. The test piece is excited to a free, decaying natural vibration by a rotational impulse. The damping factor of the decaying response vibration is determined separately for each period by routine measurement of the amplitudes of vibration. For "healthy" test pieces, the sequence of the damping factors determined must fall in value and lie inside a predetermined falling scatter band. Should the characteristic of the damping factor be of a different type, this indicates that the viscous damping medium has aged more or less strongly and provides a measure of the serviceability of the test piece.

6 Claims, 2 Drawing Sheets

METHOD OF TESTING A SEISMIC TORSIONAL VIBRATION DAMPER FOR SERVICEABILITY

BACKGROUND AND SUMMARY OF THE INVENTION

The invention generally relates to a method of testing a seismic torsional vibration damper for serviceability; and more particularly to a method in which the damping factor of the seismic torsional vibration damper is determined and compared with known damping factors of "healthy" vibration dampers to determine the service suitability of the damper under test.

A seismic torsional vibration damper is to be understood as used herein as a type of torsional vibration damper which can be flanged or attached in the manner of a flywheel to a rotating system such as the crankshaft of an internal combustion engine having a tendency to vibrate. The damper carries on the periphery a partially rotatable mass, which vibrates during the rotation of the rotating system more or less strongly in opposite phase to the excitation vibration of the system capable of torsional vibration, and thereby damps this excitation of vibration.

In German Published Unexamined Patent Application (D-OS) 2,701,319, this torsional vibration damper is formed by a mass capable of torsional vibration, which is constructed as an inertia ring, and is coupled to the securing flange of the torsional vibration damper via an elastomeric intermediate layer. Such torsional vibration dampers are normally flanged to the crankshaft of internal combustion engines, to be precise mostly to the front shaft end, and thus not to the shaft end serving the driven side of the internal combustion engine. The torsional vibration dampers are designed to dampen excitation of vibrations occurring when certain speed ranges are exceeded.

In order to test the torsional vibration damper according to the teachings of the above-noted German reference, the damper was flanged to the crankshaft of an associated internal combustion engine, and the latter was put into operation. Before this, however, the torsional vibration damper was provided at the free end face with periodic, bright/dark marks, which were bounded with sharp edges and which lie within the same periphery both for the part flanged directly onto the crankshaft and for the inertia ring capable of torsional vibration. During the operation of the engine, optical sensors are used to scan the phase angles of the central part of the torsional vibration damper, which part is flanged to the crankshaft, and of the inertia ring. By using an electronic evaluation, it is possible to determine the torsional vibration vector of the crankshaft, and the torsional vibration vector of the inertia ring of the seismic torsional vibration damper, and also their mutual phase angles. The magnitude and the mutual phase angle of the torsional vibration vectors are the criteria for testing the torsional vibration damper for serviceability which are recommended according to the teachings of this German reference. If, at definite speeds, these values fall outside a range of values determined in advance with healthy torsional vibration dampers, this is an indication that the torsional vibration damper under test is no longer working properly.

It is a disadvantage of the known test method that it requires the respectively associated internal combustion engine, and that certain speed states must be run in an expensive fashion, to which purpose an engine test stand is occupied in a costly fashion for a certain time. A further disadvantage is that the method can be carried out only if both the part of the torsional vibration damper flanged to the crankshaft, and also the inertia ring coupled so as to be torsionally rotatable, are accessible externally.

It is an object of the present invention to provide a test method for determining the serviceability of a vibration damper in such a way that the required test apparatus is simpler and the testing can be carried out more quickly.

Additionally it is a further object of the present invention to provide a test method wherein it is also possible to test those torsional vibration dampers in which the inertia ring is not accessible externally.

These and other objects are achieved by providing a method wherein the damping factor of a seismic torsional vibration damper is determined and compared with known damping factors of "healthy" vibration dampers to assess the service suitability of the damper under test. In the method, a firmly clamped torsion-spring bar is employed to provide a relatively simple test setup. It is further supplemented only by a sensor for determining the amplitude of vibration, and by and electronic evaluator, as is, however, also necessary in the prior art. A special feature of the formation of criteria according to the invention consists in that it is not the extent of the damping which is determined and compared with the "healthy" torsional vibration dampers, but the steepness of its falling off from amplitude to amplitude. Surprisingly enough, it has namely emerged that, by contrast with the normal behavior of vibration dampers having a damper factor which is constant and thus independent of amplitude, the damping factor of viscosity torsional vibration dampers has a falling characteristic which is dependent on amplitude. This falling characteristic changes depending on the state of ageing of the viscous damping medium. It can be said on the basis of this that as long as the sequence of the damping factors determined falls in value and, moreover, lies inside a predetermined falling scatter band, the viscous damping medium may still be expected to have a long service life. Such viscosity torsional vibration dampers can be reused without hesitation in the case of testing.

Advantageous embodiments of the invention employ the amplitude of rotation angle of the torsion-spring bar although it is also possible to determine the accelerator amplitude in the region of the upper end of the torsion-spring bar to obtain the same results. Moreover, the invention is described in more detail below with reference to an illustrative embodiment represented in the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
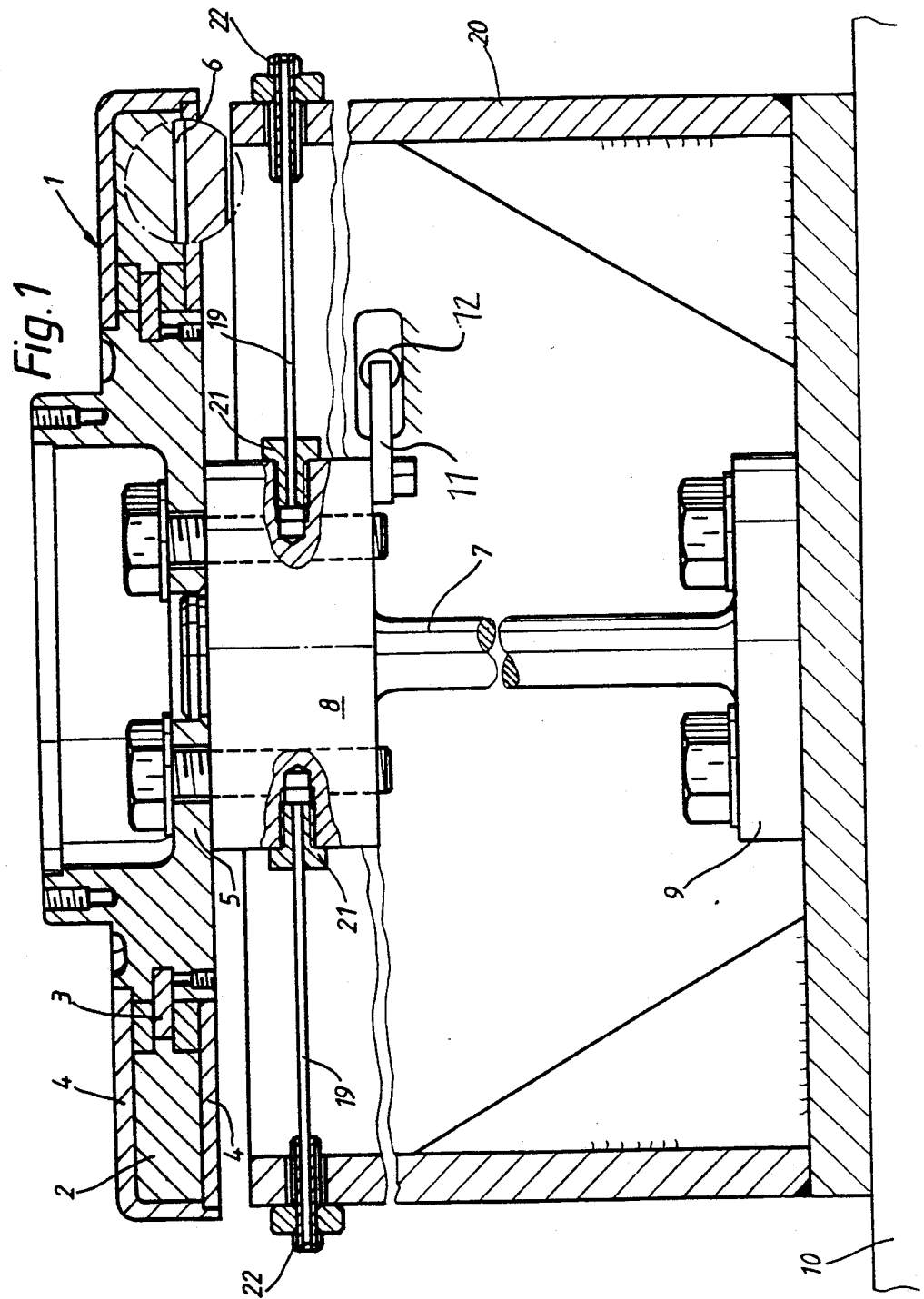
FIG. 1 shows a sectional, side view of a test setup in accordance with the teachings of the present invention for a viscous torsional vibration damper.

The viscosity torsional vibration damper 1 is also represented in section in the test stand representation according to FIG. 1. The damper 1 comprises a central part, which is normally flanged in a torsionally stiff manner onto the crankshaft of an internal combustion engine by means of a securing flange 5. An annular mass 2 is pivoted on this central part by a pivot bearing 3. The mass is enclosed liquid-tight by a housing 4, a narrow defined shear gap 6 being formed. This shear gap is filled with a viscous silicone oil, which effects a certain rotatable coupling of the mass 2 to the housing 4 or to the securing flange 5.

On cost-saving grounds, and on grounds of space and weight, the housing 4 is constructed and secured undismantably and permanently. In the event of damage, the viscosity torsional vibration damper 1 thus becomes a throw-away part. When the engine is in operation, the viscous damping medium is subjected to certain aging processes, and is changed thereby with reference to its viscosity. To be precise, when the engine is in operation, initially a thinning of the silicone oil occurs by virtue of mechanical wear. Later, a thickening of the oil takes place through chemical reaction of the latter with abraded particles of the bearing 3, which progresses more and more until it finally leads to a solidification of the silicone oil, and thus to the complete failure of the damper.

Since this aging process is not exclusively determined by the number of operating hours of the internal combustion engine or by the mileage of the associated vehicle, but first and foremost by the number of those operating hours in which critical engine speeds which had to be damped occurred, the state of ageing of the torsional vibration damper can be totally different in comparison with the state of ageing of the associated internal combustion engine. In addition, the state of ageing of the internal combustion engine or the mileage of the associated vehicle is frequently unknown, so that to this extent there is also no point of reference at hand. However, with rebuilt engines it is desired to be able to reuse the relatively expensive torsional vibration dampers where possible, for which reason the serviceability of the rotational vibration damper is to be determined reliably.

The test method according to the present invention provides an answer here. To be precise, the viscosity torsional vibration damper 1 is incorporated into a system capable of torsional vibration, which is constructed very simply. To be precise, torsion-spring bar 7 with a defined torsion spring stiffness is secured rigidly and undamped to a large stationary mass 10 by a flange 9. The viscosity torsional vibration damper 1 to be tested is likewise temporarily flanged rigidly and undamped to the free upper end of the torsion-spring bar 7, which end is likewise provided with a flange 8.

To prevent indefinite flexural vibrations of the bar 7, the free end of the bar 7 is supported rotatably movable, but radially immovable. In order to render this radial support specially low in friction, a flexural spring holder is provided in the form of three radially extending spokes 19 which are secured on the bar side in the upper flange 8, which is fashioned to be especially strong axially, and on the outside at the edge of a stable cylindrical dish 20.

Together with the lower flange 9 of the torsion-spring rod 7, the dish 20 is rigidly secured to the stationary mass, for example a large concrete block. At both ends, the spokes 19 carry swellings 21 or 22 provided with screw threads, with which it is possible to secure the spoke ends rigidly in the flange 8 or the dish edge. Together with the spokes 19, the swellings can consist of a uniform workpiece, that is they can be worked from the solid, or they can —as represented —be materially secured, that is soldered, as separate hollow-bored parts to the rod-shaped spokes. The avoidance of clamping means provides an arrangement wherein a clamping hysteresis is avoided, as well as providing a dead-end-holder capable of torsional rotation, which is especially low in friction. With the occurrence of torsional vibrations of the torsion-spring bar, the spokes 19 are subjected to flexural vibration in a plane perpendicular to the plane of the drawing.

Figure 2:
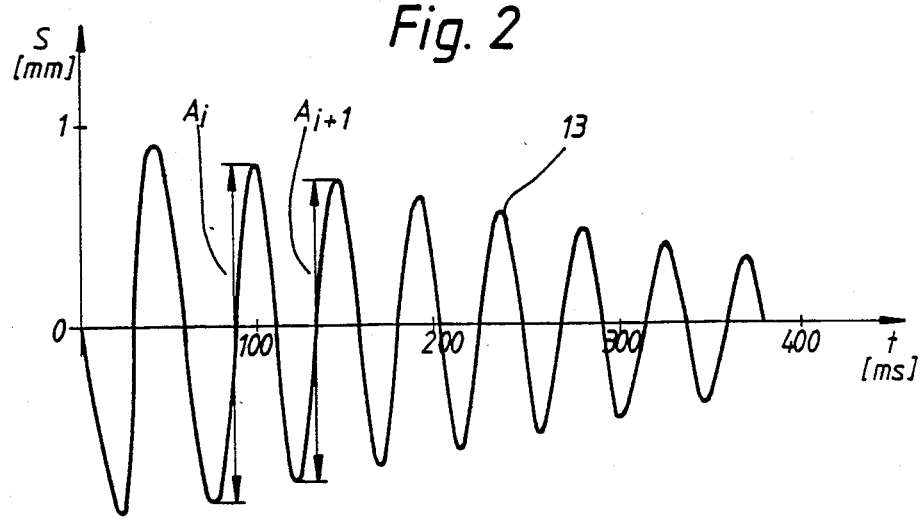
FIG. 2 shows the decaying response vibration in a time diagram.

By means of a tangential blow, the system capable of torsional vibration that has been formed in such a fashion is excited impulsively to a freely decaying natural vibration, as represented in FIG. 2. In order to be able to analyze and determine the value of a definite criterion using this response vibration, there is fixed to the flange 8 at the test-piece side of the torsion-spring bar 7 a radially projecting stop 11, at the free end of which there acts a digital displacement sensor 12, which responds in a markedly low-inertial fashion and consecutively accepts displacement values.

The torsional vibration amplitude of the upper end of the torsion-spring bar can thereby be consecutively picked up digitally and passed on to an electronic evaluation unit. Using these means, the individual successive amplitudes, $A_i$, $A_{i+1}$, $A_{i+2}$ etc. shown in FIG. 2 are now determined, and these amplitude values are temporarily stored. Subsequently, these electronically stored values of successive torsional vibration amplitudes are used to determine the damping factor $d_1$, which is a dimensionless number, which indicates the ratio of two amplitude values directly successive in time.

Normally, this damping factor $d_i$ is constant and independent of the magnitude of the amplitude excursion. A constant damping factor leads to an exponentially decaying vibration. However, with the viscosity torsional vibration dampers the damping factor $d_i$ is not constant, but depends very strongly on the amplitude of vibration. The damping factor is high at large amplitudes of vibration, and likewise decreases with decaying vibration. The damping factor of viscosity torsional vibration dampers is approximately constant only for relatively low amplitudes of vibration. Leaving aside the amplitude-dependent characteristic of the torsional vibration damping factor, the latter also varies further with the state of ageing of the viscous damping medium. In the present case, the latter is used to test the viscosity torsional vibration damper.

Figure 3:
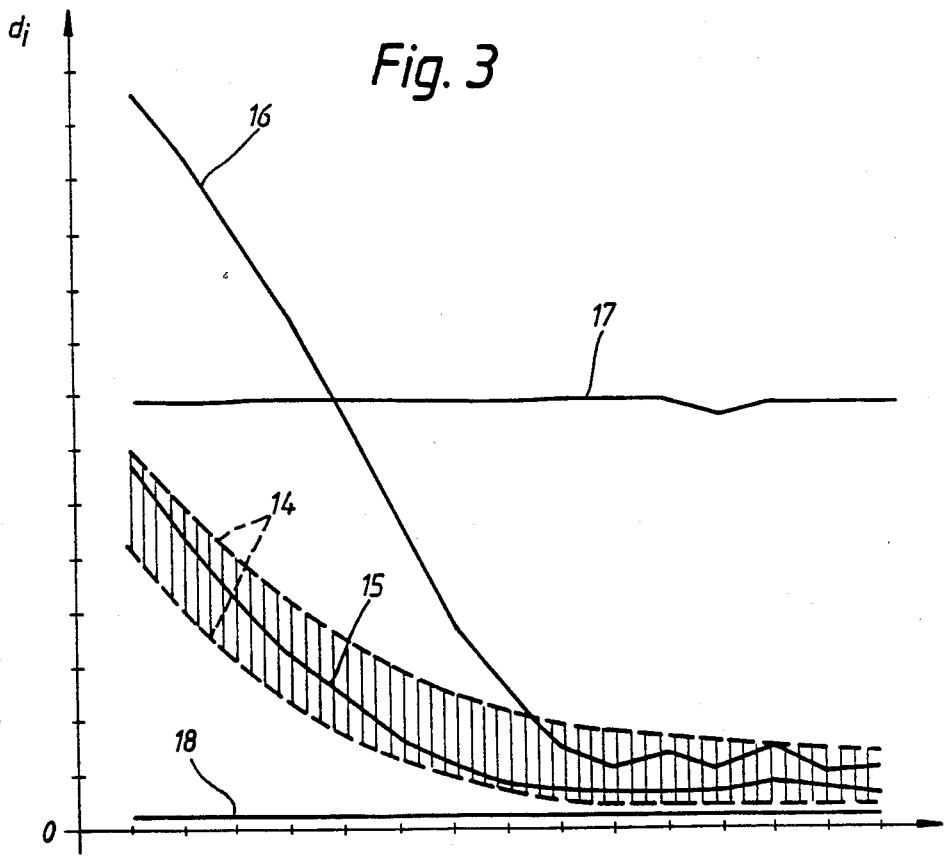
FIG. 3 shows the time characteristic of the damping factor of various viscous torsional vibration dampers of different states of aging.

The amplitude-dependent characteristic of the damping factor $d_i$ of a new viscosity torsional vibration damper is reproduced in FIG. 3 with the diagram line 15. It may be seen that the damping factor falls strongly at the beginning, and remains approximately constant only in the region of low amplitudes. The testing of a multiplicity of new viscosity torsional vibration dampers of the same design has shown that the damping factors determined therewith lie inside a certain falling scatter band 14. Test pieces of an unknown state of ageing, whose damping factors vary with amplitude in a comparable fashion, can therefore be reused without hesitation.

Apart from the scatter band 14 for new test pieces and a single diagram line 15 relating to a certain new viscosity torsional vibration damper, the diagram according to FIG. 3 also has drawn in characteristic curves of damping factors of aged viscosity torsional vibration dampers. To be specific, the diagram line 16 was determined using such a viscosity torsional vibration damper, the viscous damping medium of which exhibited an incipient thickening. For large amplitude excursions, the damping factors are substantially higher and fall substantially steeper as a function of amplitude, until they are finally in the region of low amplitudes of vibration inside the scatter band 14. This viscosity torsional vibration damper still delivered a satisfactory damping operation to the very end. Although thickened, the damping medium is still liquid, and suggests a sufficient service life for further operation of the damper; accordingly, this damper can also be reused.

By contrast, in the viscosity torsional vibration damper with the aid of which the diagram line 17 was determined, the ageing of the viscous damping medium is very much more advance; in this case, the silicone oil solidified to a gelatinous mass, so that the damping behavior altered qualitatively. To be precise, this aged torsional vibration damper exhibits an amplitude-independent, thus constant damping factor, and thereby diverges fundamentally in damping behavior from a viscosity torsional vibration damper. It is true that with this aged damper, as well, the operational performance still continued to be sufficiently satisfactory to the very end. However, because of the advanced change in the damping medium, it does not permit expectation of satisfactory service life. Accordingly, this damper is to be scrapped.

Finally, with the torsional vibration damper with which the diagram line 18 had been determined, the damping medium thickened even more, and almost completely solidified, so that the annular mass 2 is held tight immovably in the housing 4 and at the flange 5. This torsional vibration damper had entirely lost its damping property; the test piece acted only as a compact gyrating mass.

For the sake of completeness, it should be mentioned that instead of an amplitude of the rotation angle of the torsion-spring bar, as determined with the displacement sensor 12, it is also possible to determine the acceleration amplitude in the region of the upper flange 8 of the torsion-spring bar, which would lead fundamentally to the same results.

The impulsive excitation of torsional vibration does not need to be defined; thus, the excitation of vibration can take place manually, for example through a blow from the ball of the thumb administered tangentially to the periphery of the test piece. However, the system capable of torsional vibration as formed from the torsion-spring bar 7 and test piece must in each case be excited so strongly by the blow from the ball of the thumb that the first periods of the excited natural vibration lie in the strongly falling part of the scatter band 14. With the currently customary electronic evaluation employing a plotter to print out in diagrammatic form the results of the measurement results obtained, it can easily be ascertained whether the exciting blow was too slight, and whether the damping factors determined lie in the levelled-off part of the scatter band or in the steeply falling part of the scatter band. If necessary, the test procedure must be repeated with a blow from the ball of the thumb administered somewhat more strongly.

It is expedient for the natural frequency of the system capable of torsional vibration, as formed from torsion-spring bar 7 and test piece, to lie between approximately 10 and 25 Hz, preferably at approximately 15 Hz. If necessary, when testing smaller torsional vibrational dampers, a somewhat softer torsion-spring bar must be used, or a separate test stand must be provided, the torsion-spring bar of which is fashioned correspondingly softer.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Method of testing a seismic torsional vibration damper for serviceability, in which the damper to be tested is incorporated in-line, rigidly and undamped into a system capable of torsional vibration which is excited to vibrate, and the response vibration of the system capable of torsional vibration is evaluated, a single criterion from this response vibration being analyzed and compared in value with corresponding values obtained with predetermined operationally fit viscosity torsional vibration dampers of the same design, the method comprising the steps of:

(a) temporarily securing the damper to be tested to a free end of a torsion-spring bar, having a defined torsion spring stiffness, which is supported against flexural vibrations, an opposite end of the torsion-spring bar being undamped and rigidly secured to a large mass, which is stationary to form a system capable of torsional vibration;

(b) impulsively exciting the system to a free, decaying natural vibration to provide a response vibration, (c) at least during the first three periods after the impulsive excitation of vibration, measuring the amplitudes of vibration at the free end of the torsion-spring bar to which the damper to be tested is secured, separately in each case;

(d) determining a respective damping factor ($d_i$), wherein the index i is a sequential number, from amplitude ($A_i$) to amplitude ($A_{i+1}$) according to a formula $d_i = (A_i - A_{i+1})/A_i$ to provide a sequence of damping factors ($d_i$); and (e) determining if the sequence of damping factor ($d_i$) of the damper to be tested falls in value and lies inside a predetermining falling scatter band, which has been determined in the same way for operationally fit viscosity torsional vibration dampers of the same design to evaluate the serviceability of the damper to be tested.

2. Method according to claim 1, wherein the damping factors ($d_i$) are determined from the amplitudes of the rotation angle ($A_i$, $A_{i+1}$) of sequential vibration periods of the response vibration.

3. Method according to claim 1, wherein the vibration frequency of the decaying natural vibration amounts to between approximately 10 to 25 Hz.

4. Method according to claim 3, wherein the vibration frequency of the natural vibration amounts to approximately 15 Hz.

5. Method according to claim 1, wherein the impulsive excitation of the system capable of torsional vibration takes place through a blow from the ball of the thumb administered tangentially to the periphery of the test piece.

6. Method according to claim 1, wherein the serviceability of the damper to be tested is determined by the acceleration amplitude of a region of the free end of the torsion-spring bar.

* * * * *